United States Patent [19]

Baggott

[11] 4,205,464
[45] Jun. 3, 1980

[54] APPARATUS AND METHOD FOR DETERMINING THE EXTENT OF MUTUALITY BETWEEN PARTNERS

[76] Inventor: Patrick D. Baggott, 2842-a N. Weil St., P.O. Box 12286, Milwaukee, Wis. 53212

[21] Appl. No.: 833,456

[22] Filed: Sep. 15, 1977

[51] Int. Cl.² ............................................. G09B 19/00
[52] U.S. Cl. ...................................... 35/22 R; 35/9 B
[58] Field of Search ...................... 35/9 B, 9 C, 22 R; 273/1 E, 139, 272

[56] References Cited

U.S. PATENT DOCUMENTS

| | | | |
|---|---|---|---|
| 2,654,163 | 10/1953 | Reynolds | 35/9 B |
| 2,844,374 | 7/1958 | French | 273/1 E |
| 2,994,531 | 8/1961 | Eberwein | 273/139 X |
| 3,149,841 | 9/1964 | Hullman | 273/272 X |
| 3,438,628 | 4/1969 | Becker et al. | 273/139 X |
| 3,825,255 | 7/1974 | Kennard et al. | 273/139 X |
| 4,009,525 | 3/1977 | Hollander | 35/22 R |
| 4,059,272 | 11/1977 | Pullman | 273/272 X |

*Primary Examiner*—William H. Grieb
*Attorney, Agent, or Firm*—Andrus, Sceales, Starke & Sawall

[57] ABSTRACT

Method and apparatus are disclosed for determining the extent of mutuality as between partners in respect to a given question involving a form of multiple choice answer. The partners initially consider the question and multiple choice answer selection. The partners then, privately and in turn, record their answer on a comparator instrument. The instrument is then actuated to invoke a signal indicating the extent of mutuality with respect to the question. The apparatus is a calculator-type instrument having memory storage capacity for sequentially receiving the answer from the respective partners. Upon actuation, the instrument compares the answers and invokes the signal indication.

1 Claim, 2 Drawing Figures

APPARATUS AND METHOD FOR DETERMINING THE EXTENT OF MUTUALITY BETWEEN PARTNERS

NATURE AND SUMMARY OF THE INVENTION

This invention relates to a method and apparatus for reaching greater understanding between sexual partners regarding their sexual activity.

Even as between marital partners, many areas of human sexual activity are difficult to broach or discuss for fear of self-embarrassment or of upsetting the sensitivities of the other partner. Such fears can frustrate discussion of and/or participation in activities the partners may in fact mutually desire. It is generally an object of this invention to provide a method and apparatus for ferreting out those areas of human sexual activity which the partners are mutually willing to discuss and consider and/or eliminate other areas where mutuality proves non-existent.

Basically, the invention relates to a method and apparatus for determining the extent of mutuality as between sexual partners in regard to various areas of sexual behavior. Generally, the apparatus comprises an instrument for recording, in turn, a form of multiple choice answer for the partners in response to a given question. The instrument then compares the answers and indicates the extent of mutuality. According to the method the partners consider a given question having a form of multiple choice answer. Each partner in turn records the answer on comparator means. The comparator means is then actuated to invoke signal means for indicating the extent of mutuality.

DESCRIPTION OF THE DRAWING FIGURES

The drawings furnished herewith illustrate the best mode contemplated for carrying out the invention and are described hereinafter.

In the drawings:

FIG. 1 is a view of the panel board of a calculator-type device to be used by the sexual partners to ascertain areas of sexual activity regarding which they are mutually willing to discuss and consider and/or to eliminate other areas where mutuality proves non-existent; and FIG. 2 is a wiring diagram as pertains to the calculator-type device of FIG. 1.

DESCRIPTION OF THE ILLUSTRATED EMBODIMENT

Figure 1:
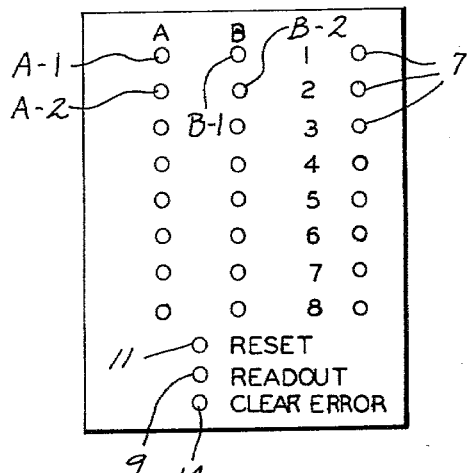

The calculator-type device of FIG. 1 may be a hand held instrument for use by sexual partners A and B. The instrument is used by the partners to record their answers, in turn, to a type of multiple choice question in a manner to be described hereinafter.

Figure 2:
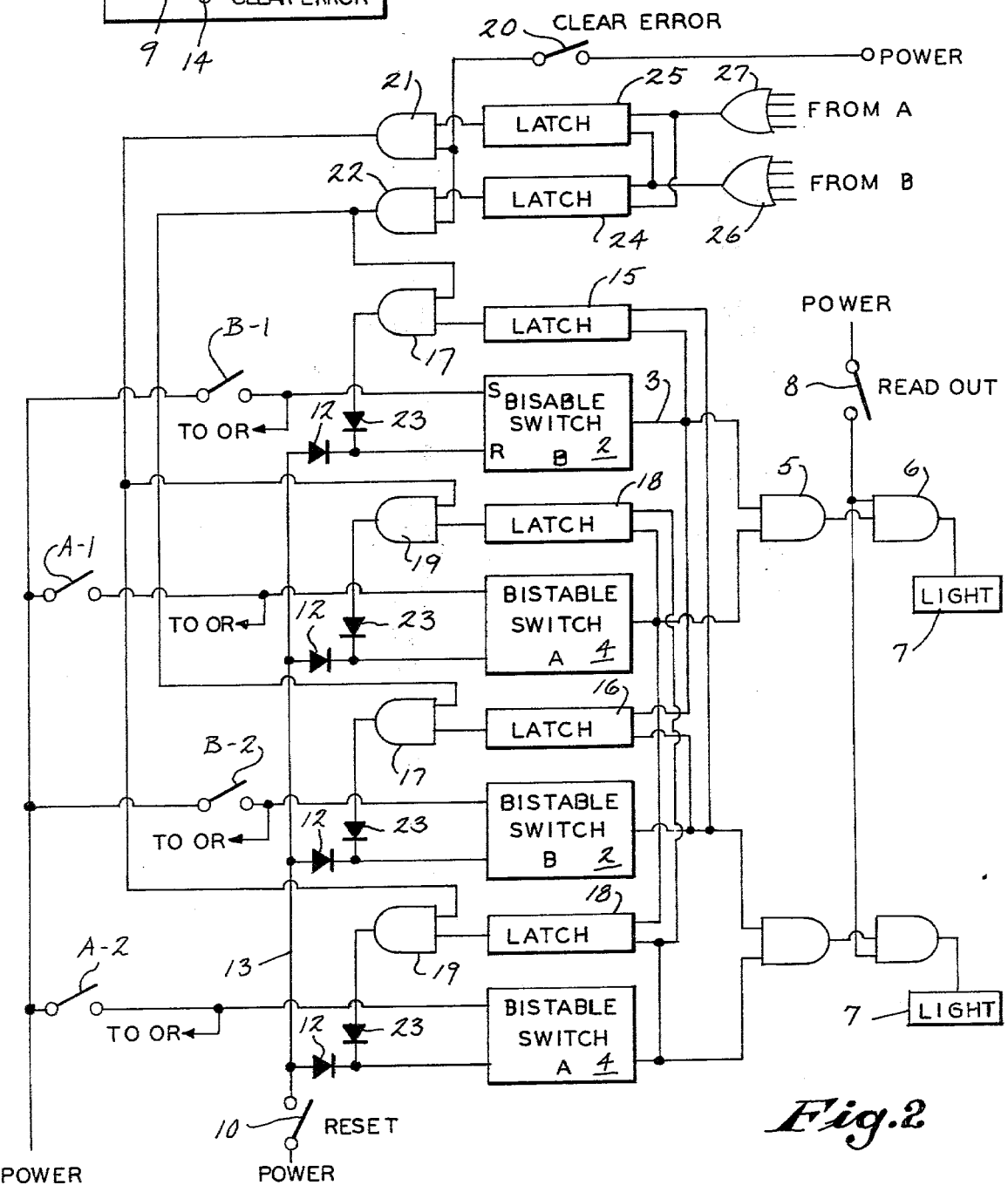

Referring particularly to FIG. 2, a simple logic circuit illustration has been provided interconnecting the outputs based upon the selection of buttons in rows A and B of the instrument of FIG. 1 by the corresponding partners.

As each of the buttons in rows A and B actuate similar circuitry, the control circuit for the first and second buttons of rows A and B are illustrated in FIG. 2; the buttons are identified by the row letter, corresponding to the operating partners, and the associated number assigned serially, as A-1, A-2, etc. and B-1, B-2, etc. The other buttons would be connected into similar circuitry and interlocked with each other and with the illustrated buttons in the same manner as now described for the buttons A-1, A-2, B-1 and B-2.

Thus, each of the buttons is coupled to actuate a corresponding normally open switch which is connected into a signal logic channel for detecting the actuation of such switch and comparing it with the state of the corresponding switch actuatable by the corresponding button in the other of the two rows of buttons.

More particularly, referring to the push button switch B-1, it is connected between input power line 1 and one input of a bistable switch or flip-flop unit 2 which is adapted to be set in either of two stable states at the output line 3. A first binary logic output at output line 3 is created in response to the setting of unit 2 and by a signal at the input "S" and a second binary logic output is created in response to the resetting thereof by a signal at the input "R". When the operator closes switch B-1, the bistable switch unit 2 is set and a logic "1" output is created indicating the actuation and providing a memory of the switch actuation. The related switch A-1 is similarly connected to the input of a second bistable switch unit 4. The outputs of the bistable switches 2 and 4 are connected to a two input AND gate 5 which provides a logic "1" output only when both bistable switches A-1 and B-1 are set. The output of the AND gate 5 is connected as one input to a second two input AND gate 6, the output of which is connected to energize the corresponding indicator or lamp 7. The second input of the second AND gate 6 is connected to logic power through a read-out switch 8 coupled to a read-out button 9. Thus, when the read-out button 9 is actuated, power is applied to the second AND gate 6 and if a signal also exists at its first input, the lamp is illuminated. If not, lamp 7 will of course remain off. Thus, all buttons of row A and B are similarly compared and actuation of button 9 will reveal to the partners those selections having the corresponding answer by reason of the illumination of certain lamps 7.

All of the bistable switches 2 and 4 have their reset inputs "R" connected to reset power in series with a common reset switch 10 actuated by the reset button 11. An isolating diode 12 is connected between the main reset line 13 and each of the reset inputs "R" to isolate the several reset inputs from each other. This permits separate clearance of the last actuated switch by the actuation of the "clear error" button 14, as presently described.

When the "clear error" button 14 is actuated by either one of the operators, only the last button actuated should be reset. The logic circuit for such a system is similarly provided for each of the switch channels as follows:

Referring particularly to switch B-1, the output of the bistable switch 2 is also connected to the set input of a second bistable switch or latch unit 15 and simultaneously actuates the latch unit whenever the push button B-1 is actuated. The output of bistable switch 2 is also simultaneously connected to the reset input of the latch unit 16 for switch B-2 and for all other corresponding switches in row B. Thus, when a push button in row B is actuated, only the last push button switch latch 15 or 16 is set. The output of each latch 15 or 16 is connected to an AND gate 17 for anding with the "clear error" circuit button 14, which also provides for distinction between which column button was last actuated, as presently described.

Similarly, the output of the bistable switch 4 for switch A-1 is connected to the set input of a latch circuit 18 for switch A-1 and to the reset input of all other latch circuits 18 for other A related push button bistable switches 4. The corresponding latches 18 for switches A-1 and A-2 are connected to similar AND gates 19 for anding with the single "clear error" circuit button 14, as follows:

A "clear error" switch 20 associated with the "clear error" button 14 is connected to power and to a first input of a pair of two input AND gates 21 and 22. The outputs of gates 21 and 22 are connected respectively to the second inputs of AND gates 17 and 19. The output of gates 17 and 19 are connected to the reset input of the related bistable switches 2 and 4 for switches A-1 and B-1.

The output of the AND gates 17 and 19 is coupled through a blocking or steering diode 23 directly to the reset input of the corresponding bistable switch. When the "clear error" switch 20 is actuated, the reset signal is transmitted through the circuit to the last actuated bistable switch for that particular column to reset the switch and allow the operator to change the selection or remove such selection.

The second input to the AND gates 21 and 22 is coupled to the row A and B switches through interlocking latch units 24 and 25, the inputs of which are responsive to the actuation of the row A and B switches A-1 and B-1, etc. Thus the latch unit 24 for channel B has its set input connected to respond to each of the button switches B-1 through B-8 through an OR gate 26. Thus, the latch unit 24 is set each time a row A button is actuated. The output of the OR gate 26 is also connected to the reset input of the opposite or B column latch unit 25 and this unit is simultaneously reset with the setting of latch unit 24. The output of an OR gate 27 for the row A button switches is similarly connected to set latch unit 25 and to the reset of the latch unit 24. Thus, the last row A or B switch button that is actuated sets its latch and simultaneously resets the opposite latch. This, then, provides a positive or logic "1" output to only the AND gate 21 or 22 associated with the last actuated push button switch. The conditioned AND gate 21 or 22 thus provides a logic "1" output if the "clear error" switch 20 is actuated but only to the reset circuitry for switches A-1 through A-8 or switches B-1 through B-8. This logic signal is further anded with the output of the particular one of the switches actuated by the AND gates 17 and 19 which are connected by the diodes 23 to the reset inputs of the bistable switches 2 and 4.

In summary, actuation of any one of the push buttons in row A or B closes a corresponding switch A-1, B-1, etc. to set the corresponding bistable switch 2 or 4 and provide a logic output to the AND logic circuitry for illuminating of the appropriate lamps 7 only when the corresponding numbered buttons have been actuated. Any last actuated button in row A or B can be cleared by actuation of the "clear error" button 14, which will provide a reset signal only to the last actuated bistable switch. The total system is reset by the reset button 11 providing a direct reset signal to each and every one of the bistable switches via line 13.

The electronic calculator-type instrument of FIG. 1 is intended for use by the sexual partners in association with a series of questions relating to human sexual behavior and having a form of multiple choice answers.

The instrument of FIG. 1 can be used with questions offering a lesser number of answer choices, but is capable for up to as many as eight possible answer choices corresponding to the number of button actuators in rows A and B of the instrument. The questions can relate to the areas of how, when, where, how often, active vs. passive roles, and a host of other areas pertaining to human sexual behavior.

By way of example, one of the questions might relate to the frequency preference for sexual relations for the partners, and for multiple choice answer selction offer the following: (1) at least once a month, (2) at least twice a month, (3) at least once a week, (4) at least three times a week, (5) at least five times a week, and (6) more than five times a week.

Faced with the foregoing question and multiple choice answer selection and with the instrument of FIG. 1 in hand, each of the partners, in turn, record their answers on the instrument. They do so in private or at least in a manner so that the other partner cannot see what answer choices are being selected. Each of the partners select all of the answers that apply to him or herself. Thus, if the partner registering answers in the A column of the instrument believes it to be desirous to have sexual relations five times per week in accordance with the fifth answer above, all answers 1 through 5 apply in his or her case so that that partner would depress the corresponding buttons 1 through 5 of column A. If the other partner registering answers in column B of the instrument believes three times per week would be desirable, he or she would similarly depress the corresponding buttons 1 through 4 of column B.

With the partners having registered their answers on the instrument, the readout button 9 is depressed and the extent of their mutuality in regard to the question at hand is immediately indicated by the lighting of lamps 7 numbered 1 through 4 on the instrument. Having ascertained the extent of their mutuality on the question under consideration, the partners at least know the minimum bounds for discussion and consideration without fear of self-embarrassment or of upsetting the sensitivities of the other partner. After the instrument is cleared by depressing the reset button 11, the partners can move on to the next question they choose to consider.

Various modes of carrying out the invention are contemplated as being within the scope of the following claims particularly pointing out and distinctly claiming the subject matter which is regarded as the invention.

I claim:

1. A method for determining whether there is mutuality as between partners by presentation of a series of given questions, said questions invoking a form of multiple choice answer with a player selected choice as to each question and as a group providing an indication of the degree of mutuality, comprising presenting the questions and possible answers for individual consideration by the partners, recording the separate answer of each partner to each said question, privately and in turn, on comparator means to separately determine the mutuality as to each question, and actuating the comparator means to invoke signal means for indicating the extent of mutuality, if any, with respect to the complete series of given questions and thereby indicating whether there is and the degree of mutuality between the partners with respect to the given questions.

* * * * *